(No Model.) 2 Sheets—Sheet 1.
W. H. SAWYER.
APPARATUS FOR MEASURING THE RESISTANCE OF ELECTRICAL COILS IN PROCESS OF MANUFACTURE.
No. 245,567. Patented Aug. 9, 1881.
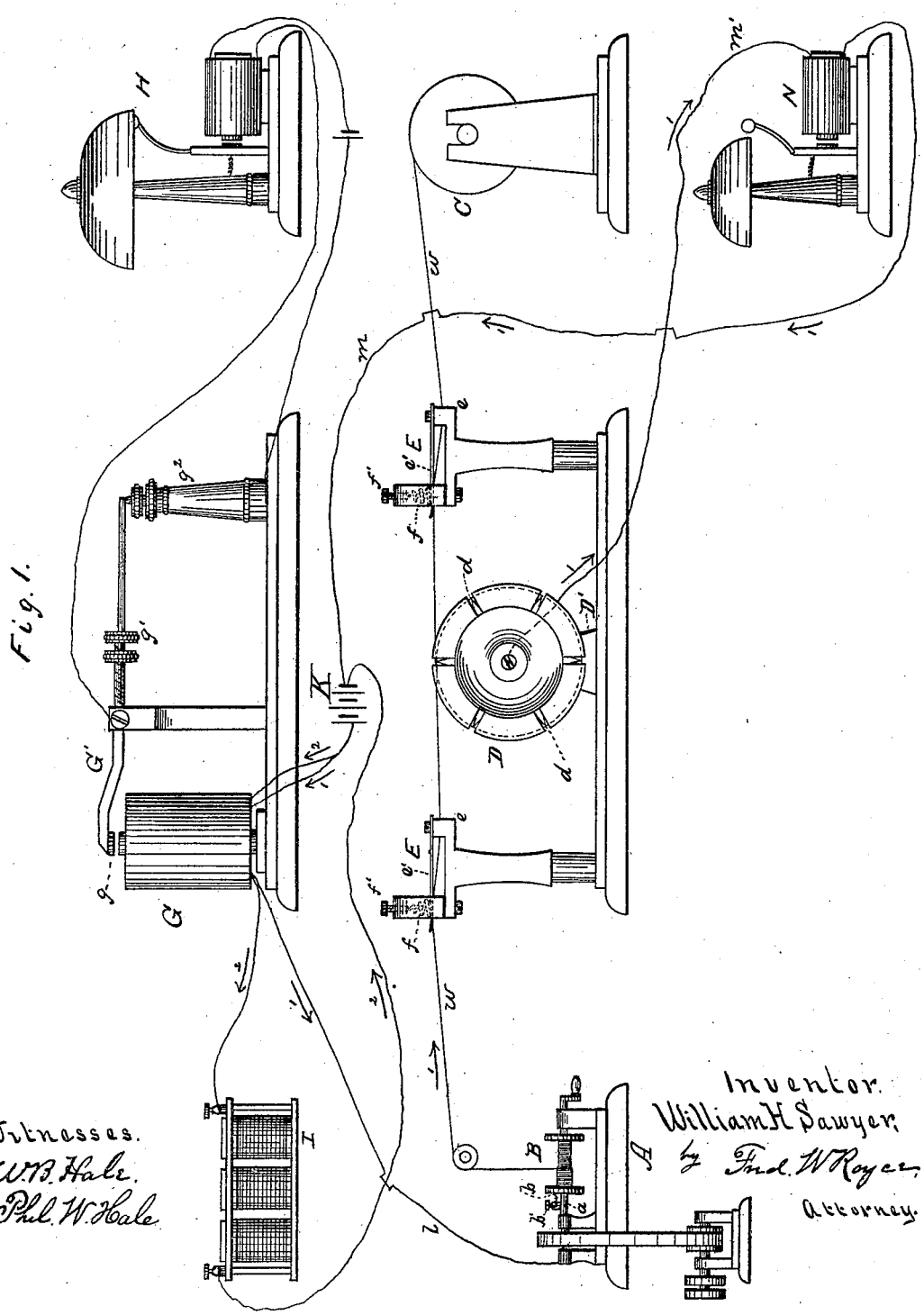

(No Model.) 2 Sheets—Sheet 2.
W. H. SAWYER.
APPARATUS FOR MEASURING THE RESISTANCE OF ELECTRICAL COILS IN PROCESS OF MANUFACTURE.
No. 245,567. Patented Aug. 9, 1881.
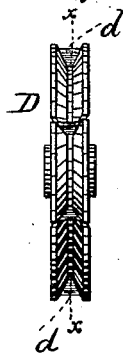
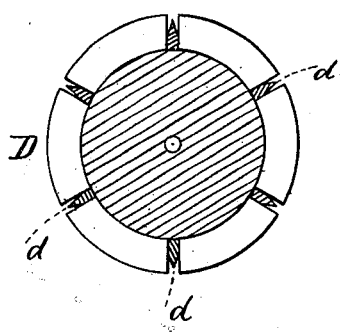
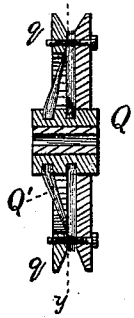
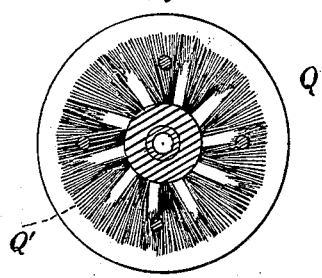
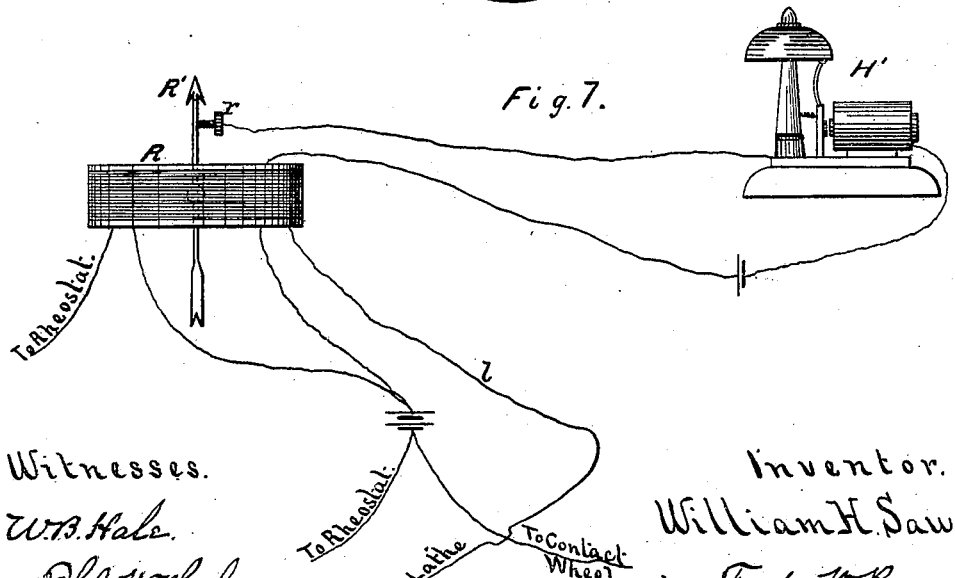
Witnesses.
W. B. Hale.
Phil. W. Hale.
Inventor.
William H. Sawyer,
by Fred. W. Royer.
Attorney.

UNITED STATES PATENT OFFICE.

WILLIAM H. SAWYER, OF PROVIDENCE, RHODE ISLAND.

APPARATUS FOR MEASURING THE RESISTANCE OF ELECTRICAL COILS IN PROCESS OF MANUFACTURE.

SPECIFICATION forming part of Letters Patent No. 245,567, dated August 9, 1881.

Application filed June 8, 1881. (No model.)

*To all whom it may concern:*

Be it known that I, WILLIAM H. SAWYER, a citizen of the United States, residing at Providence, in the county of Providence and State of Rhode Island, have invented certain new and useful Improvements in Apparatus for Measuring the Resistance of Electrical Coils in Process of Manufacture; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to an apparatus for testing the resistance of covered wire coils while they are being wound, its object being to give notice of the completion of coils to the desired resistance and of any rupture of the wire which may occur in the process of winding.

In the accompanying drawings, Figure 1 is a diagram illustrating the construction of apparatus according to my invention. Fig. 2 is an edge view of the contact-wheel, and Fig. 3 is a section of the same in the plane indicated by the line $x\,x$ of Fig. 2. Figs. 4 and 5 are diametric sections of modification of the contact-wheel. Fig. 6 is a section on line $y\,y$ of the form of wheel shown in Fig. 5, and Fig. 7 shows a modification of the apparatus in which a differential galvanometer is used in lieu of the differential magnet.

Referring to Fig. 1, the letter A denotes a winding-lathe of well-known construction, and between the two parts of the spindle of which is held a spool, B, upon which a coil of covered or insulated wire is to be wound.

The letter C designates the reel from which the wire is delivered to the spool, and D is the contact-wheel, over and preferably around which the wire passes on its way to said spool. This wheel D is made of electrical conducting material, and has formed in its periphery a V-shaped groove, as shown in Fig. 2, across the bottom of which, at intervals, are arranged radial metal plates $d$, having their outer edges similar to a knife-edge, but not very sharp, said plates being secured in radial slits formed in the wheel, as shown clearly in the sectional view, Fig. 3. The wheel has a metallic axle or arbor turning in metallic bearings formed in the post D'.

On opposite sides of the wheel D are arranged tension-regulators E E, each consisting of a block, $e$, supported by a suitable standard, and having secured to a projecting portion at one end of its upper surface a spring-tongue, $e'$, which bears upon the upper surface of a similar projection at the other end of the block. Upon the free end of the tongue bears a spiral spring, $f$, the tension of which is regulated by a suitable screw, $f'$, supported by a loop or bracket.

The letter G denotes a differential magnet having two coils wound in opposite directions, and arranged to counteract each other when electric currents of equal quantity flow over them simultaneously and in opposite directions, thus leaving the cores of the magnet neutral. When, however, a preponderance of current flows over one of the coils the cores of the magnet will be magnetized in proportion to the excess of one current over the other, and the armature-lever G' may be so balanced or adjusted by means of an adjustable weight, $g'$, that the armature $g$ will be attracted when this excess reaches or exceeds any given degree. When the armature $g$ is released by the cores of the magnet the free end of the metallic armature-lever falls and makes contact with the top of a metal post, $g^2$, thus closing a local-battery circuit which includes a bell, H, one terminal of said circuit being connected to the post $g^2$ and the other with the metallic bearing of the metal pivot of the armature-lever. Both of the coils of the differential magnet have one terminal connected with the same pole of a battery, K, the opposite terminal of one coil being connected with one of the main terminals of a rheostat, I, the other main terminal of which is connected with the opposite pole of the battery, while the other coil of the differential magnet has its opposite terminal connected by a wire, $l$, with the metal spindle $a$ of the lathe A through the metallic bearing of said spindle.

From that pole of the battery to which the rheostat I is connected a wire, $m$, leads to the coil of an electric bell, N, and thence a wire, $m'$, leads to the metallic bearing of the axle of wheel D.

Supposing that an electrical coil is to be wound of ordinary silk or cotton covered wire, the operation of the apparatus as now described is as follows: The wire $w$ is led from the reel C under the tongue of the first tension-regulator, passed once around the grooved periphery of the wheel D in contact with the knife-edges of the metal plates d, thence through the second tension-regulator and to the spool B, its end being passed through a small hole at b in one of the heads of the spool, and its tip bared and connected with a binding-post, b', which is screwed into the metal lathe-spindle. The tension upon the wire is then so regulated that it will be kept properly taut in winding, and that it will be drawn with such force upon the knife-edge of the metal plates d that said edges will separate the spirals of the covering-thread and form metallic contact with the metal wire core. The knife-edges should have only such a degree of sharpness as will enable them to force aside and pass between the thread-spirals without cutting the same. The rheostat is now to be adjusted to interpose in the circuit of which it forms a part a resistance equal to the resistance which the coil to be wound is to have, and the battery-current, before any of said coil is wound, will almost entirely flow from the negative pole of the battery, as shown, in the direction indicated by the arrows No. 1, through one of the coils of the differential magnet, over wire l to the lathe-spindle, thence over the wire w to wheel D, and then over the metal plates d, which make contact with the metal wire core, over the wheel and its axle and wire m' to the bell N, and thence to the positive pole of the battery. The current passing over the coils of the bell N magnetizes the cores, and they, attracting the armature, hold the hammer away from the bell as long as the circuit remains unbroken. If the circuit should be interrupted by the accidental breaking of the wire being wound— say inside its covering at a point where the breakage would not be observed—the magnet of bell N releases its armature and the bell-hammer strikes the bell, thus giving notice of a rupture of the circuit. Owing to the great resistance offered by the rheostat, but little of the current at first flows in the direction of the arrows No. 2, and therefore a preponderance of current in the coil of the differential magnet which forms a part of the circuit indicated by arrows No. 1 will cause the magnet-cores to be magnetized and the armature attracted, thus raising the lever G' and keeping open the local-battery circuit. The flow over the circuit indicated by the arrows No. 2, however, increases as the amount of wire increases upon the spool, and when that amount becomes sufficient to balance the resistance of the rheostat the battery-current will divide evenly and equal portions flow over the two coils of the differential magnets, which will counteract each other's effect, and the cores of the magnet will become neutral, releasing the armature g and allowing the lever G to fall and complete the circuit of bell H, the ringing of which announces that the desired quantity of wire giving the proper resistance has been wound upon the spool.

Instead of the contact-wheel having the knife-edged plates, I may use a metal wheel, P, as shown in Fig. 4, having its periphery grooved and the grooved surface provided with a multiplicity of metal points so arranged that the wire will not pass between them. When the wire is drawn around the wheel the points will be forced between the threads and make metallic contact with the wire core.

In another form of contact-wheel, as shown at Q in Figs. 5 and 6, one wall, q, of the groove is removable, and a wire brush, Q', projects radially from the hub of the wheel and into the groove, the removable wall q being secured in place by screws. The tips of the wires of the brush form the bottom of the groove and enter between the thread-spirals of the covering of the wire.

The tufts of metallic bristles or wires composing the brush may be set in a wooden hub and connected with the metal axle of the wheel by suitable metal strips or wires.

In Fig. 7 the connections to the battery are the same as in Fig. 1; but the two wires leading from the negative pole connect with the terminals of the two coils of a differential galvanometer, R, the opposite terminals of which are connected one to the wire l, leading to the lathe, and the other to the rheostat, and through it to the positive pole of the battery. A contact-stud, r, is arranged on one side of the needle R' of the galvanometer, and while the preponderance of current flows through one coil of the galvanometer during the winding of a coil the needle will be deflected away from the stud; but when the resistance of the increasing coil balances the resistance offered by the rheostat the needle will be unaffected by the current and assume a vertical position by gravity, coming in contact with the stud r and closing the circuit of a battery over the bell H', which rings to announce the completion of the coil.

What I claim is—

1. The combination, with an apparatus for winding electrical coils of covered wire, of devices for forming electrical contact with the wire through its covering and completing an electrical circuit, including the coil portion of the wire, substantially as and for the purpose set forth.

2. The combination, with an apparatus for winding electrical coils of covered wire, of an electrical circuit including an alarm or indicator, and devices for including in said circuit the continuously-increasing quantity of covered wire in a coil in process of manufacture by forming electrical contact with the wire through its covering as it passes onto the coil or spool, substantially as described.

3. The combination, with an apparatus for winding electrical coils of covered wire, of a differential electrical indicating apparatus including two circuits in opposition to each other, one of said circuits including a resistance to balance the coil to be wound, and the other arranged for connection with a coil in process of winding by means of devices for penetrating the covering of the wire and forming electrical contact therewith, substantially as described.

4. An electrical apparatus for indicating the resistance of a coil of covered wire in process of winding, provided with devices for completing an indicating-circuit over the wire of the coil by penetrating the covering of said wire with metallic points included in said circuit to form electrical connection therewith, substantially as described.

5. The combination, with the differential magnet having two coils in opposition to each other, one of said coils including a rheostat in its circuit, of a device for penetrating the covering of a covered wire in process of being wound into a coil, said wire being included in circuit with the other coil of said differential magnet, in which is also included said device for penetrating the covering.

6. The combination, with a differential electrical indicating apparatus and a device for penetrating the covering of a passing covered wire, said wire being included in one of the circuits of said indicating apparatus, which also includes said penetrating device, of an alarm controlled by said indicating apparatus.

In testimony whereof I affix my signature in presence of two witnesses.

WILLIAM H. SAWYER.

Witnesses:
GEORGE B. BARROWS,
JOSEPHINE S. BARROWS.